(12) United States Patent
Lambrache et al.

(10) Patent No.: US 7,437,616 B2
(45) Date of Patent: Oct. 14, 2008

(54) DUAL CPU ON-CHIP-DEBUG LOW-GATE-COUNT ARCHITECTURE WITH REAL-TIME-DATA TRACING

(75) Inventors: Emil Lambrache, Campbell, CA (US); Benjamin F. Froemming, San Jose, CA (US); Andrew K. Au, Fremont, CA (US)

(73) Assignee: Atmel Corporation, San Jose, CA (US)

( * ) Notice: Subject to any disclaimer, the term of this patent is extended or adjusted under 35 U.S.C. 154(b) by 469 days.

(21) Appl. No.: 11/304,425

(22) Filed: Dec. 15, 2005

(65) Prior Publication Data

US 2007/0168731 A1    Jul. 19, 2007

(51) Int. Cl.
  *G06F 11/00* (2006.01)
(52) U.S. Cl. ......................................................... 714/43
(58) Field of Classification Search .................... 714/26, 714/27, 37, 39, 43, 46, 57
See application file for complete search history.

(56) References Cited

U.S. PATENT DOCUMENTS

| | | | |
|---|---|---|---|
| 5,053,949 A | 10/1991 | Allison et al. ............... 364/200 |
| 5,737,516 A | 4/1998 | Circello et al. .......... 395/183.14 |
| 5,978,937 A | 11/1999 | Miyamori et al. .............. 714/45 |
| 6,094,530 A * | 7/2000 | Brandewie ................... 717/127 |
| 6,173,419 B1 | 1/2001 | Barnett ......................... 714/28 |
| 6,202,172 B1 * | 3/2001 | Ponte ........................... 714/31 |
| 6,249,881 B1 * | 6/2001 | Porten et al. ................... 714/38 |
| 6,691,258 B1 * | 2/2004 | Herold et al. .................. 714/45 |
| 6,915,416 B2 * | 7/2005 | Deng et al. .................. 712/227 |

* cited by examiner

*Primary Examiner*—Nadeem Iqbal
(74) *Attorney, Agent, or Firm*—Schwegman, Lundberg & Woessner, P.A.

(57) ABSTRACT

The same microcontroller chip is configured to be either a Target version or a Link version of a microcontroller. The Target version runs an application program. To debug the Target microcontroller, the Link version of the microcontroller functions as a master debug microcontroller to the slave Target microcontroller running the application program. The Link microcontroller runs an interface translator program between a Host computer that runs a debug program, and the Target microcontroller. The Link microcontroller communicates with the Target microcontroller using a fast, 2-wire interface. The Link microcontroller communicates with the Host computer through a general purpose interface.

25 Claims, 3 Drawing Sheets

DUAL CPU ON-CHIP-DEBUG LOW-GATE-COUNT ARCHITECTURE WITH REAL-TIME-DATA TRACING

TECHNICAL FIELD

The invention relates to microcontroller and, in particular, to monitoring and debugging of a microcontroller application program.

BACKGROUND ART

A microcontroller, such as those in the various versions of the 8051 family of microcontrollers, includes a microprocessor, code memory, peripherals, and port registers mounted on a single chip. The microprocessor includes an arithmetic/logic unit, SRAM/register files, an address controller, a program counter, etc.

To find various run-time errors in a microcontroller application that includes a microcontroller and other associated hardware, a debugger system is used. A debugger program runs on a Host computer and executes a host program for the purpose of finding run-time errors. Such errors are often not apparent until a debug program is either actually executed in a Target microcontroller system or is executed in a simulator for the Target microcontroller system. A debugger system provides various diagnostic features such as executing the program until a certain address (a breakpoint) is reached, single-stepping through instructions while displaying the contents of CPU registers, status bits, or input/output ports.

Various debugging techniques have used interfaces that require a number of interconnect wires, such as 6-wire and 8-wire interfaces that use scarce pins on a low-cost microcontroller. Often the Host computer that provides a debugging program must be specially programmed to provide appropriate drivers for the microcontroller. Tying up several pins of a low-cost microcontroller along with the design time for providing suitable interfacing between the Host computer and the microcontroller are significant obstacles to successfully debugging various microcomputer applications.

Note that some debug approaches for microcontrollers make an expanded, special chip version of a Target microcontroller chip to facilitate debugging. The expanded chip version has extra pins that are used to interface with an extra parallel or serial channel that provides an additional port through which extra information is input/output to/from the register file of the Target microcontroller. These extra pins are connected to some sort of debug master or to the Host computer with the same parallel or serial interface. The expanded portion of the special chip version of a Target microcontroller chip can be as big as the regular part of the Target microcontroller chip in case of a parallel expansion interface. Producing a standard chip and an expanded chip requires two different mask sets. For a low-cost, high volume microcontroller, such as a 8051 type, the expanded chip is expensive and impractical because of the low cost nature of the standard 8051 chip, while the expanded, special version would be a low volume, expensive chip. Again, emulating the special chip would require another expanded chip of the expanded chip. As a consequence, a 20 pin part is emulated by a 40 pin part, etc.

A goal of debugging is to provide an alternate way for a debug program developer to have access to the internal resources of a microprocessor of the microcontroller. Access is needed to the register file and the program counter of the microprocessor, which are internal elements and are not usually available at the ports of the microcontroller. In an 8051 type of microcontroller, I/O ports are special registers that have to attend to their own tasks in a target application environment. These I/O ports receive signals from the application operating environment, but the debug program developer may also want to use these same ports. It is desirable that the register file and the peripheral register be accessible even when all of the ports are used for communication with the environment of the application being debugged.

SUMMARY

The present invention provides a Link microcontroller between a Host computer and a Target microcontroller. The Link microcontroller and the Target microcontroller are the same chip that is configured by a EEPROM fuse to be either a Link Master microcontroller or a Target Slave microcontroller. The Link microcontroller that functions as a master includes: 1) means for running an interface translator program between a Host computer and the Target microcontroller; 2) means for communicating with the Target microcontroller using a fast, 2-wire communication interface, and 3) means for communicating with the Host computer that is running monitor or debugging software for the application system in which the Target microcontroller is embedded. The Link microcontroller provides internal access to the Target microcontroller without using the I/O ports of the Target microcontroller. The Link microcontroller thereby provides an interface with the Host computer where the interface is that of a general purpose microcontroller with all of its available resources. This general purpose interface with the Host computer simplifies the task of a developer creating a monitoring/debug program that runs on the Host for debugging an application system that uses the Target microcontroller.

The fast, 2-wire communication interface can be optimized for efficient communication between the Link microcontroller and the Target microcontroller. The two-wire communication is performed using two pins, for example a reset pin and one of the XTAL pins for an 8051 type of microcontroller, that are easily expendable in a debugging environment. Thus, the full I/O capability of the Target microcontroller is available for an application being debugged.

The Target Slave microcontroller has hardware means to: 1) run any end user application program with no restrictions; 2) means for communicating with the Link microcontroller using a fast, 2-wire communication interface (the Link and Target are two copies of an identical design and the Link-Target interface is the same subcircuit.), and 3) run a special debugging program called a monitor residing in a small, special purpose storage area outside the user program memory.

The present invention also provides a method of monitoring a microcontroller application program, comprising the steps of: running a program on a Host computer for monitoring an application program running on a Target microcontroller; interfacing between the Host computer and a Link microcontroller (that is an identical copy of the Target microcontroller) running an interface translator program between the Host computer and the Target microcontroller; and the Target microcontroller running the user application program and the debugging monitor program. The Link microcontroller shields the Target microcontroller so that the Link-Target microcontroller couple appears to the Host computer as having a general purpose interface, effectively acting as a port expander.

To reduce the amount of intrusion on the Target microcontroller required to implement a debug interface, that interface must be serial in nature. Several general purpose serial interfaces such as UART, SPI, and I2C already exist. The advantage of using a general purpose interface is that any existing device which implements that interface can act as the master of the debug interface. The disadvantage of using a general purpose interface is that these general purpose interfaces generally require large amounts of hardware on a Target device and require more software in a monitor to handle the communication, thereby increasing the cost of the Target microcontroller.

To reduce the cost of debugging, a custom interface is provided that reduces both the gate count of the hardware interface and the software overhead in the monitor and still maintains high throughput. One example of such an interface is provided. Such a custom interface has no previously existing implementations, so there is no device to act as a master. Instead of designing a second chip to act as the master, the same design is used in the present invention for both a master (Link) and a slave (Target), thereby saving an additional mask set and development time. Using the same design is possible when at least 90% of the interface hardware is identical between the master and slave devices so that the cost increase for a dual use Link-Target chip is not great.

A custom hardware interface for the master is preferred over one that can be implemented in software on a generic master microcontroller. The advantages of using the Link-Target from the same chip design are that the achievable communication rate will be higher because the interface is implemented entirely in hardware and the development time for the debug system will be shorter because the system developer does not need to handle the low level details of the interface and can instead work at a higher level.

DETAILED DESCRIPTION

Figure 1:
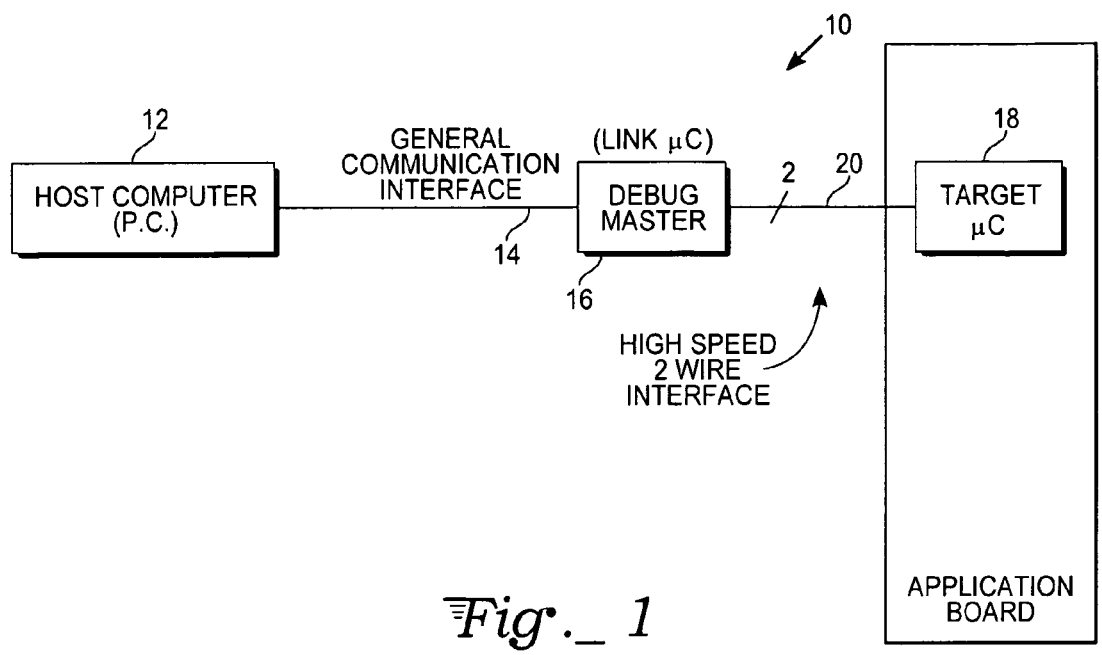
FIG. 1 is a block diagram showing a Host computer that communicates with a Link microcontroller through a general communication interface and also showing the Link microcontroller communicating through a 2-wire interface with a Target microcontroller that is embedded in an application circuit board.

FIG. 1 shows a microcontroller debugging system 10 that includes a Host computer, such as a personal computer, 12 that is connected through a general communication interface 14 to a Link microcontroller 16. The Link microcontroller 16 functions as a debug master for a slave Target microcontroller 18. The Link microcontroller 16 and the Target microcontroller 18 communicate through a high-speed 2-wire interface 20. The Target microcontroller 18 is typically embedded in an application environment that includes an application circuit board that provides, for example, other integrated circuit packages, relays, sensors, actuators, etc., for a particular application. The Link microcontroller 16 and Target microcontroller 18 are different copies of the identical chip.

As previously mentioned, a microcontroller includes a microprocessor, code memory, peripherals, and port registers. The microprocessor itself includes an arithmetic/logic unit, SRAM/register files, an address controller, a program counter, etc. A debugger system needs access to various elements of the microprocessor such as the register file, the program counter, etc. so that the debugger system can provide various diagnostic features such as executing the program until a breakpoint is reached, single-stepping through instructions while displaying CPU registers, status bits, or input/output ports, etc.

A microcontroller in the 8051 family typically has 40 I/O pins and four I/O ports, each having 8 pins. For debugging purposes, the 2-wire interface 20 obtains access to the microcontroller through only 2 pins that are not otherwise needed for debugging. A typical microcontroller is designed to be produced at low cost with a minimum number of pins, such as 20 pins for some types of 8051s. Because extra pins are at a premium in a microcontroller such as an 8051 type, it is therefore very desirable that only 2 pins be used for debugging or diagnosis of a microcontroller system. Two such pins are a reset pin and a XTAL2 pin because an external clock signal can be applied to the XTAL1 pin to provide a clock signal to the microcontroller. In any normal application these two pins are not I/O pins, therefore they are expendable without affecting the performance of the end user application. The general communication interface 14 for a PC Host computer 12 can be provided by a UART (which is quite slow if it is used to communicate directly with the Target microcontroller 18) or a serial peripheral interface SPI can also be used.

The Link microcontroller 16 facilitates communication between the Host computer 12 and the Target microcontroller 18 and provides several functions. The Link microcontroller 16 functions as an interface translator from/to the general communication interface 14 to/from the fast 2-wire interface 20. The Link microcontroller 16 can function as a data buffer to collect information for fast transmission. One fast 2-wire interface 20 is described in U.S. patent application Ser. No. 11/166,290 filed Jun. 23, 2005, entitled "Fast Two Wire Interface and Protocol for Transferring Data", and invented by Emil Lambrache and Benjamin F. Froemming. U.S. patent application Ser. No. 11/166,290 is incorporated herein by reference in the present invention.

A significant feature of the Link microcontroller 16 is that it is designed to be of the identical design as the Target microcontroller 18. The advantage of this is that the design of the chip is suitable for use as a Link or alternatively as a Target microcontroller. Using the same microcontroller design for both the Target microcontroller 18 and the Link microcontroller 16 requires that each microcontroller be configured slightly differently using a EEPROM fuse to Provide either a Link microcontroller or a Target microcontroller. The Link serves as a master for debugging and the Target is its slave.

The same fast 2-wire interface circuit design which is on the Target is also on the Link and is called the OCD interface hereafter. The OCD interface works in Master mode on the Link and in Slave mode on the Target. The Link can use its own static RAM as a data buffer and assemble appropriate data packets so the Host computer will not be interrupted for every single byte.

If the Link OCD interface and the Target OCD interface were designed and optimized separately, they would end up being more than 90% identical. This is why the same chip design is used for both the Target and the Link.

When the Target microcontroller receives a debug interrupt request, either by a break instruction in the application code itself or by a signal coming from the OCD interface, the Target microcontroller jumps to the monitor program. The monitor program controls extracting data from the register files and possibly modifying the contents of some registers, or even modifying the code on the fly. The monitor program resides in a protected memory space.

Figure 2:
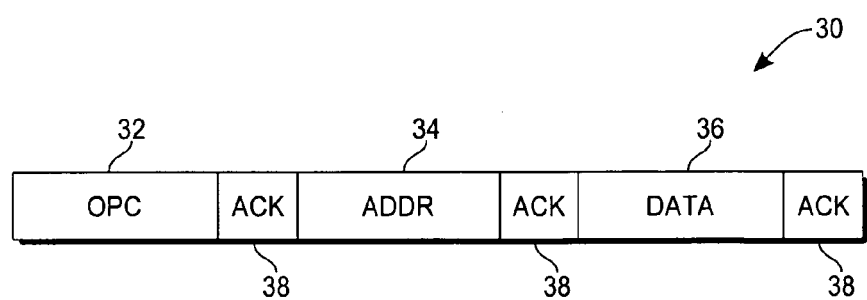
FIG. 2 illustrates the structure of a command frame sent over the wire interface between a Link microcontroller and a Target microcontroller.

FIG. 2 illustrates the structure of a command frame 30 sent over the OCD interface 20 between the Link microcontroller 16 and the Target microcontroller 18. The data frame 30 is formed with 3 bytes. The data frame includes an opcode OPC byte 32, an address ADDR byte 34, and a DATA byte 36. Each byte is followed by an acknowledgement ACK bits 38 sent from a receiver back to a transmitter.

The size of the monitor program, which resides above the top of the code memory in a Target microcontroller, can be further reduced if hardware is designed and optimized to do part of the tasks, such as to assemble bytes in packages of three. The interface design optimizes the three byte protocol, therefore the monitor code is simplified because the monitor does not have to tell the interface where to fetch and store the various bytes. This basically simplifies the monitor so that the task of extracting and modifying the data is split between the hardware on the Target and the software in the Link. The Link software takes care of items that would require large amounts of code in the Target monitor program.

The Link also unrolls the complex, high level commands from the Host computer. The Link does these tasks in software and not in dedicated hardware.

The Link, in effect, shields the Target and makes the interface to the Host computer appear as a general purpose interface. The full memory in the Link can be tailored to unroll the tasks coming form the Host computer. The Target thereby has very little overhead to interfere with running of the application program being debugged.

A key characteristic of the present invention is the small amount of overhead and the small amount of code needed to implement monitoring of the Target microcontroller. Also, only one chip design is needed for both the Target and the Link. The monitor program in the Target is only 128 bytes out of 2 k or 8 k bytes in various 8051 configurations. In the debug master, the Link, all of the hardware overhead of a port expander for the Target is moved from hardware into software.

The present invention includes the concept of using the same chip design that provides both a target chip and a Link debug chip simultaneously. The Link chip also contains a system clock circuit that uses a minimum number of gates (but is not active on the Target).

The debug master provided by the Link is a translator and a buffer. The software on the link depends on what the Host computer wants to achieve because the Host computer cannot be efficiently directly connected to the Target. The 2-wire OCD connection needs to be shielded by the Link, like a virtual machine, from the Host computer. The best protocol is three bytes, including OPCODE, ADDRESS, and DATA IN or DATA OUT. After each byte is sent an acknowledge bit is returned from the receiver. The OPCODE and ADDRESS are provided by the Link to the Target. WRITE DATA is sent from the Link to the Target. A READ DATA is sent from the Target to the Link. Depending on the OPCODE the DATA BYTE will either be an input or output. A small controller determines which way the DATA byte is sent.

Figure 3:
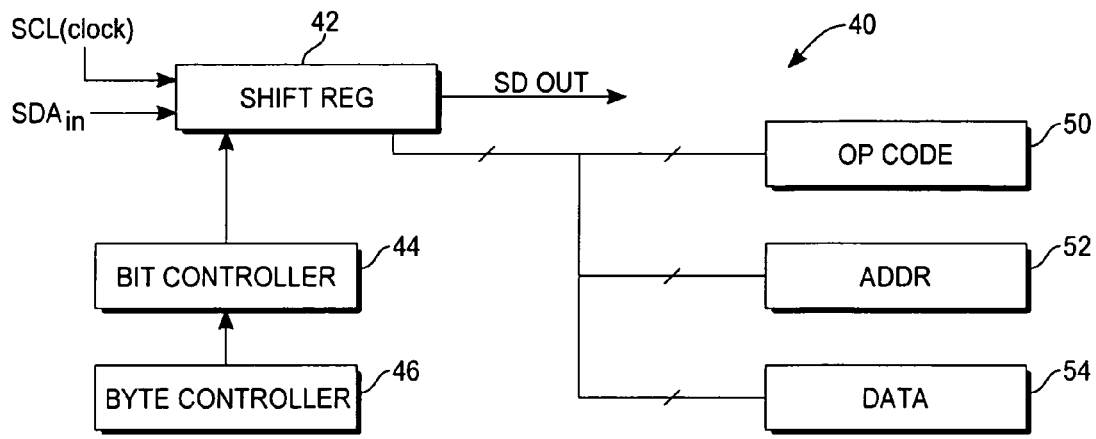
FIG. 3 is a diagram that illustrates a hardware implementation of a command frame that is used in either a Link microcontroller or a Target microcontroller and that includes an opcode, an address, and data.

FIG. 3 is a diagram that illustrates an arrangement 40 for sending an OPC byte 32, an ADD byte 34, and a DATA byte 38. A shift register 42 receives the data as serial data SDIN and outputs it as serial data out SDOUT. A bit controller 44 handles the physical layer. Acknowledgement of receipt of 8 bits is handled by the bit controller, which is a 4 bit counter. A finite state machine FSM implements a byte controller 46 for fetching OPC, ADD, and, depending on whether the OPCODE is a read or write function, it sends or receives the DATA. The shift register 42, the bit controller 44, and the byte controller 46 are all implemented in small blocks of hardware.

When the shift register 42 is finished receiving, the data in it goes to one of three registers OPCODE register 50, ADDR register 52, and DATA register 54, which are mapped into the address space of the CPU in special function registers. In the 8051 there are certain register locations which you can address bits in, so the OPCODE or STATUS are provided as bit addressable because this requires very low overhead in the monitor program and bits in the opcode can be checked to decode certain functions. Certain bits can be used for status.

The OCD interface contains a status special function register (not shown) which provides a flag to indicate when the OCD interface receives a byte. Another flag indicates that transmission is done. All of the hardware is designed with a single purpose which is to make the monitor software as short as possible and use a minimum number of gates.

Figure 4:
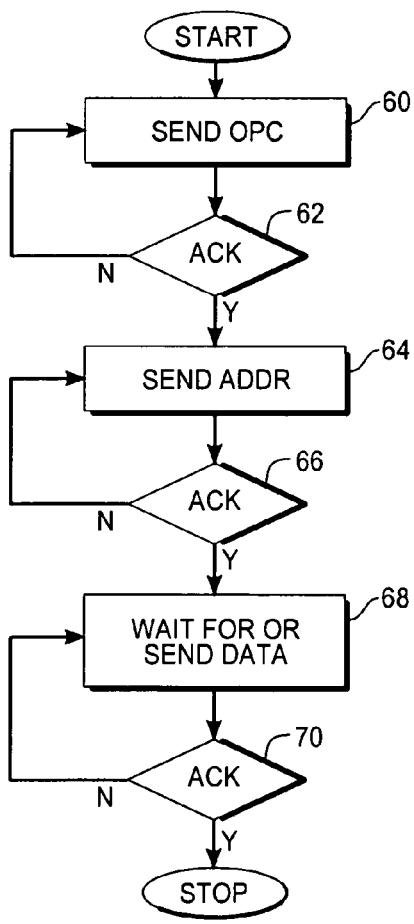
FIG. 4 is a flow chart illustrating sending of an opcode, an address, and data interspersed with acknowledgments.

FIG. 4 illustrates a sequence of bytes and acknowledgements between the Link and Target. In block 60 the Link continues to send OPC bytes until ACK block 62 determines that the Target has sent back an ACK to the Link. After that, block 64 indicates that the Link continues to send ADDR bytes until ACK block 66 shows that the Target has sent back an ACK to the Link. During Read Block 68 receives DATA from the Target. During Write Block 68 continues to send DATA to the Target until ACK Block 70 indicates an acknowledgement to end the sequence.

Figure 5:
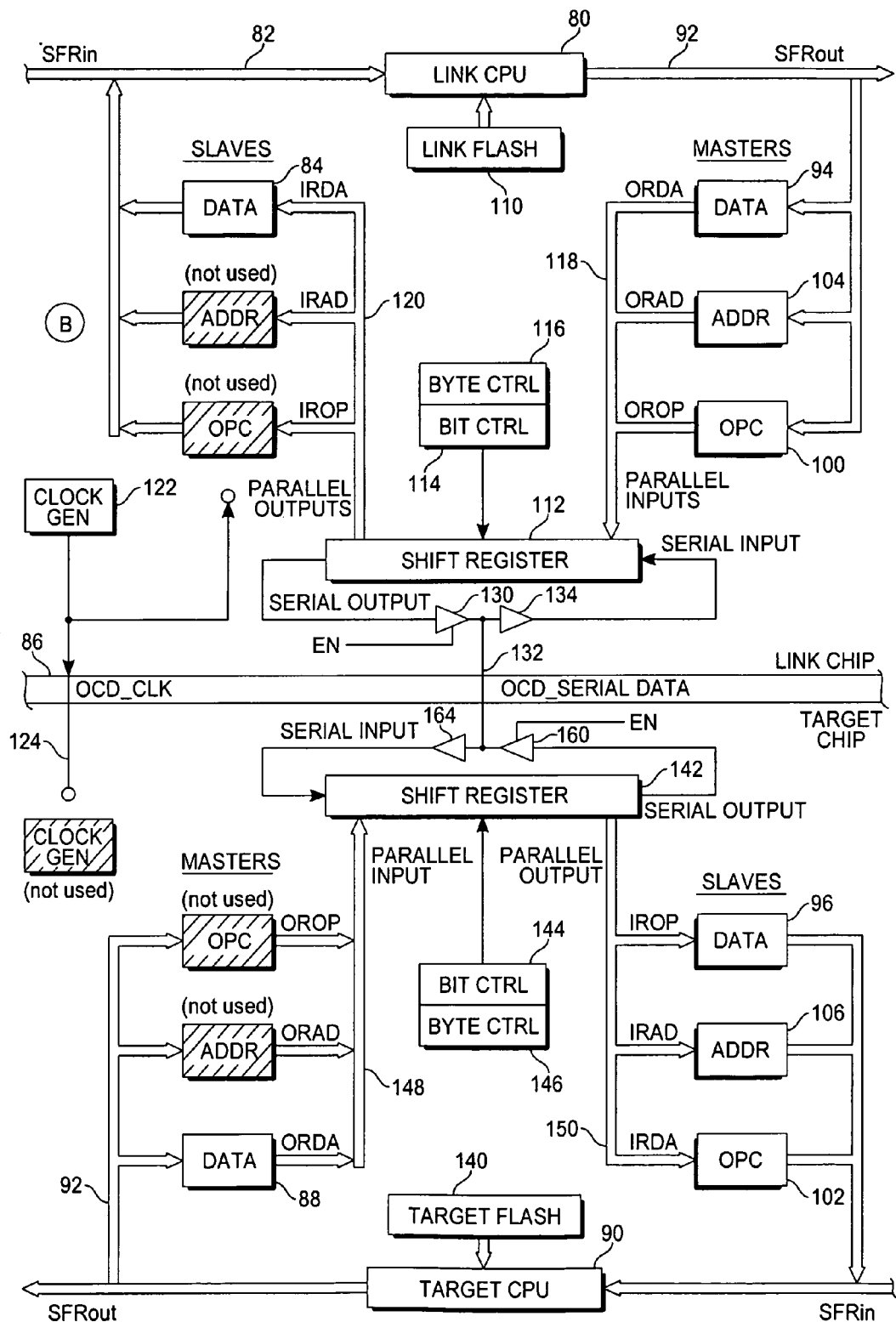
FIG. 5 is a detailed block diagram illustrating circuits in the Link microcontroller chip and the Target microcontroller chip.

FIG. 5 illustrates in detail the OCD interface components in the Link microcontroller chip, the Target microcontroller chip, and the interface 86 there between.

FIG. 5 shows the Link CPU 80, the Link latches 84, 94, 100, 104 along with the Target CPU 90 and the Target latches 88, 96, 102, 106. The high speed interface 86 is also shown.

The Link CPU 80 has flash memory 110. A Link shift register 112 is controlled by a bit control circuit 114 and a byte controller circuit 116. The Link shift register 112 receives input from the master latches 94, 100, 104 on a Link output register bus 118. The Link shift register 112 provides output on a Link input register bus 120 to the DATA slave latch 84. The Link chip has a clock generator circuit 122 that is activated to supply clock signals to the Link and to the Target through an OCD_CLK line 124. Serial output from the Link shift register 112 is provided through an enabled buffer 130 to an on-chip debug serial interface signal line 132 that is part of the high speed interface 86 between the Link and the Target. Serial input from the interface 86 is received on line 132 and passes through a buffer 134 to the serial input of the Link shift register 112.

The Target CPU 90 has a flash memory 140. A Target shift register 142 is controlled by a bit controller circuit 144 and a byte controller circuit 146. The Link shift register 142 receives input from the master DATA latch 88 on a Target input register bus 148. The Target shift register 142 provides outputs on a Target input register bus 150 to the DATA slave latch 96, ADDR slave latch 106 and the OPC latch 102. The Target chip receives OCD_CLK from the Link. Serial output from the Target shift register 142 is provided through an enabled buffer 160 to the on-chip debug serial interface signal line 132. Serial input from the interface 86 is received on line 132 and passes through a buffer 164 to the serial input of the Target shift register 142.

Each register is provided as eight master/slave flip-flops. Each of the flip-flops in a register is comprised of two latches. To save silicon, each flip-flop is broken into two latches, a master latch, and a slave latch. For the OPCODE and ADDRESS bytes, we split the register with one half feeding into the shift register and one half feeding out of the shift register.

The Link CPU writes in the master latches. All of the registers that the CPU reads from are slaves. The hardware interface writes to the slaves and reads from the masters.

Corresponding registers in the Link and the Target share the same address. A systemic fuse is programmed to indicate that a chip is to be used as a Link not as a Target.

The ACK signals provide flow control between the Link and the Target. OPCODE is always sent from the Link to the Target. The byte controller 146 on the Target knows if the Target is currently executing either application software or is already in the monitor program. If the Target is in the monitor mode, it can immediately acknowledge the opcode. If the Target is not in the monitor mode, the Target does not send ACK and the Link sends the OPCODE again. In some cases, the OPCODE can be such as to force the Target CPU to jump to the monitor. The Link may try sending the OPC a number of times. An acknowledgment ACK is always a one bit.

When the Link wants to read data, the Target does not acknowledge the read ADDR until the Target has loaded data into its buffer. When the monitor reads data into a register, it sets a flag to acknowledge. The Link will continue to send OPCODE or ADD if the Target does not send an ACK signal. The Link byte controller keeps on sending the same byte until it gets the ACK signal. There is a limit on the number of resends, such as eight, based on normal system speeds. If a timely ACK is not received, an error message is sent to the Host computer. After address ADD and data DATA bytes are sent, the Link acknowledges the data back to the Target. When the Target sees that the final ACK is received from the Link, the Target waits for the next command. During a write, the Target will not acknowledge its write operation until the write operation has already happened. The Target reads the data, writes it to the location, and, when it is done sets a corresponding flag.

The acknowledgment ACK signals are not byte dependent because their behavior is not totally described by the byte in front of them, but is described by the general latency of the microcontrollers. The present system has to work with quite a wide range of clocks. For example, the Link normally runs at the highest frequency that is possible so as not to bother the HOST with excessive delay. The Link can run at a clock frequency of 20 MHz in order not to monopolize the Host computer for too long of a time.

Real time data tracing is a mode in which the interface remains active even after the Target resumes an application mode. The Target can send out data as fast as the Link rate. The OCD clock is under the Link control and the link has to have a way to jam the clock. As long as the Link acknowledges, the byte controller in the Target will dump its data as fast as it can in real time. This is useful for certain kinds of application, such as real time data trace. One can insert a single command to move data from the application board and write, for example, the value from a port for a motor to the OCD and back to the Link. Over a time period of a second, we can assemble data as to how the motor operation has varied to see, for example, if a control loop for the motor is damped, oscillating, etc. Important operational data can be saved to the OCD program.

What is claimed is:

1. A microcontroller application monitoring system, comprising:
    a Host computer that runs monitor software for an application system in which a Target microcontroller is embedded;
    a Link microcontroller that is a chip of the same design as a Target microcontroller chip and that is alternatively configured as the Link microcontroller, wherein the Link microcontroller includes:
    a) means for running an interface translator program between the Host computer and the Target microcontroller;
    b) means for communicating with the Target microcontroller using a fast 2-wire communication interface; and
    c) means for communicating with the Host computer through a general communication interface such that the Link microcontroller shields the Target microcontroller and the Link microcontroller appears to the Host computer as having a general purpose interface;
    wherein the Target microcontroller includes:
    a) means for running an end user application program without restriction;
    b) means for communicating with the Link microcontroller using a fast, 2-wire communication interface; and
    c) means for running a special debugging program called a monitor.

2. The system of claim 1 wherein the Target microcontroller is embedded in an application board having application components.

3. The system of claim 1 wherein the Link microcontroller is a master and wherein the TARGET microcontroller is a slave to the Link microcontroller.

4. The system of claim 3 wherein information is exchanged between the Link microcontroller and the Target microcontroller in a command frame format having an Opcode byte, an Address byte, and a Data byte.

5. The system of claim 4 wherein a receiver microcontroller of a byte sends an acknowledge bit to the sender microcontroller.

6. The system of claim 4 wherein each of the Link microcontroller and the Target microcontroller has input byte latches for storing bytes received from the other microcontroller and wherein each of the Link microcontroller and the Target microcontroller has output byte latches for sending bytes to the other microcontroller.

7. The system of claim 1 wherein each of the Link microcontroller and the Target microcontroller include:
    a shift register having a serial input port for receiving serial byte information from the other microcontroller, having an output port for sending byte information to the other microcontroller, and a clock terminal;
    a bit controller that counts nine shifts of the shift register for the byte plus acknowledge bit;
    a byte controller for controlling byte operation of the shift register.

8. The system of claim 6 wherein the shift registers each of the Link microcontroller and the Target microcontroller deliver received byte information to slave latches and send byte information from master latches.

9. The system of claim 7 wherein each of the master latches are part of a master slave register flip flop and wherein each of the slave latches are part of a master slave register flip flop.

10. The system of claim 1 wherein space for a Target microcomputer monitor program is provided in code memory for the Target microcomputer.

11. The system of claim 1 wherein space for a Link microcomputer monitor program space is provided in data memory for the Link microcomputer.

12. The system of claim 1 wherein an interface between the Host computer and the Link microcontroller is a general purpose interface so that the Host computer interacts with the Link microcontroller as a general purpose microcontroller with the available resources of said Link microcontroller in order to simplify development of the monitor software by the Host computer.

13. The system of claim 1 wherein the fast, 2-wire communication interface between the Link microcontroller and the Target microcontroller is a fast, 2-wire system that uses only two external pins of the Link microcontroller and of the Target microcontroller.

14. The system of claim 1 wherein the Target microcontroller and the Link microcontroller communicate over a 2-wire system that uses a Reset pin and one crystal XTAL connection pin of the Target microcontroller for external connection terminals.

15. The system of claim 1 wherein the Target microcontroller and the Link microcontroller belong to the same chip design with an operational difference being provided with a fuse link.

16. The system of claim 1 wherein the monitor software run by the Host computer provides for debugging the application program of the Target microcontroller.

17. A method of monitoring a microcontroller application program, comprising the steps of:
running a program on a Host computer for monitoring an application program running on a Target microcontroller;
interfacing between the Host computer and the Target microcontroller with a Link microcontroller that is the same chip as the Target microcontroller;
running with the Link microcontroller an interface translator program between the Host computer and the Target microcontroller;
communicating between the Link microcontroller and the Target microcontroller using a fast wire communication interface; and
communicating between the Link microcontroller and the Host computer through a general communication interface such that the Link microcontroller shields the Target microcontroller and the Link microcontroller appears to the Host computer as having a general purpose interface.

18. The method of claim 17 wherein the step of interfacing between the Host computer and the Target microcontroller with a Link microcontroller includes the Link microcontroller providing a general purpose interface to the Host computer so that the Host computer interacts with the Link microcontroller as a general purpose microcontroller with the available resources of said Link microcontroller in order to simplify development of the monitor software of the Host computer.

19. The method of claim 17 including embedding the Target microcontroller in an application board having application components that communicate with the Target microcontroller.

20. The method of claim 17 wherein the Link microcontroller is a master and wherein the Target microcontroller is a slave to the Link microcontroller.

21. The method of claim 17 including the step of exchanging bytes between the Link microcontroller and the Target microcontroller in a command frame format having an Opcode byte, an Address byte, and a Data byte.

22. The method of claim 17 including providing a general purpose interface between the Host computer and the Link microcontroller so that the Host computer interacts with the Link microcontroller as a general purpose microcontroller with the available resources of said Link microcontroller in order to simplify development of the monitor software of the Host computer.

23. The method of claim 17 wherein the step of the Link microcontroller communicating with the Target microcontroller using a fast wire communication interface includes using a fast, 2-wire system that uses only two external pins of the link microcontroller and of the Target microcontroller for monitoring purposes.

24. The method of claim 17 wherein the Target microcontroller and the Link microcontroller are the same chip and providing an operational difference between the two microcontroller with a fuse link.

25. The method of claim 17 wherein the step of running a program on a Host computer for monitoring an application program running on a Target microcontroller includes debugging the application program of the Target microcontroller.

* * * * *

UNITED STATES PATENT AND TRADEMARK OFFICE
CERTIFICATE OF CORRECTION

PATENT NO. : 7,437,616 B2 Page 1 of 1
APPLICATION NO. : 11/304425
DATED : October 14, 2008
INVENTOR(S) : Lambrache et al.

It is certified that error appears in the above-identified patent and that said Letters Patent is hereby corrected as shown below:

On Sheet 1 of 3, in Fig. 1 (Below Reference Numeral 16), line 2, delete "2 WIRE" and insert -- 2-WIRE --, therefor.

On Sheet 2 of 3, in Fig. 3 (Reference Numeral 50), line 1, delete "OP CODE" and insert -- OPCODE --, therefor.

In column 5, line 67, delete "38" and insert -- 36 --, therefor.

In column 8, line 35, in Claim 3, delete "TARGET" and insert -- Target --, therefor.

In column 10, line 35, in Claim 23, delete "link" and insert -- Link --, therefor.

Signed and Sealed this

Tenth Day of February, 2009

JOHN DOLL
*Acting Director of the United States Patent and Trademark Office*